United States Patent
Iinuma (10) Patent No.: US 7,239,310 B2
(45) Date of Patent: Jul. 3, 2007

(54) DISPLAY APPARATUS INCLUDING SCREEN SAVER FUNCTION

(75) Inventor: Nobuharu Iinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/124,231

(22) Filed: Jul. 29, 1998

(65) Prior Publication Data

US 2001/0043203 A1 Nov. 22, 2001

(30) Foreign Application Priority Data

Feb. 13, 1998 (JP) .............................. 10-031805

(51) Int. Cl.
G09G 5/00 (2006.01)
(52) U.S. Cl. ...................... 345/211; 345/212
(58) Field of Classification Search ........... 345/204, 345/211, 212, 213, 117; 365/618, 867
See application file for complete search history.

(56) References Cited

U.S. PATENT DOCUMENTS

| | | | | |
|---|---|---|---|---|
| 4,980,836 A | * | 12/1990 | Carter et al. ............... | 364/483 |
| 5,335,168 A | * | 8/1994 | Walker ....................... | 364/242 |
| 5,548,763 A | * | 8/1996 | Combs et al. ............... | 395/750 |
| 5,548,765 A | * | 8/1996 | Tsunoda et al. ............. | 395/750 |
| 5,602,567 A | * | 2/1997 | Kanno ........................ | 345/132 |
| 5,699,104 A | * | 12/1997 | Yoshinobu ................... | 725/27 |
| 5,738,527 A | * | 4/1998 | Lundberg .................... | 434/322 |
| 5,926,640 A | * | 7/1999 | Mason et al. ............... | 395/750.03 |
| 5,963,282 A | * | 10/1999 | Battersby .................... | 349/86 |
| 6,076,169 A | * | 6/2000 | Lee ............................ | 713/320 |
| 6,085,326 A | * | 7/2000 | Kim ............................ | 713/300 |
| 6,246,397 B1 | * | 6/2001 | Vossler ....................... | 345/204 |
| 6,256,008 B1 | * | 7/2001 | Sparks et al. ............... | 345/117 |
| 6,288,715 B1 | * | 9/2001 | Bain et al. .................. | 345/211 |
| 6,523,127 B1 | * | 2/2003 | Takasu ....................... | 713/324 |

FOREIGN PATENT DOCUMENTS

| | | | |
|---|---|---|---|
| JP | 3-71388 | | 7/1991 |
| JP | 5-265385 | | 10/1993 |
| JP | 7-049680 | | 2/1995 |
| JP | 7-168547 | | 7/1995 |
| JP | 8-286647 | | 11/1996 |
| JP | 10133635 A | * | 11/1996 |
| JP | 410307568 A | * | 11/1998 |
| JP | 411231850 A | * | 8/1999 |

OTHER PUBLICATIONS 533,406, Aug. 1999, Derwent.*
Notice of Reason for Rejection for Japanese Application No. 10-031805; mailed Nov. 14, 2006.
Notice of Reasons for Rejection of Japanese Patent Application No. 10-031805, mailed Mar. 22, 2006.

* cited by examiner

Primary Examiner—Richard Hjerpe
Assistant Examiner—Jean Lesperance
(74) Attorney, Agent, or Firm—Staas & Halsey LLP (57) ABSTRACT

In a notebook type personal computer, the operation mode of this personal computer is switched into a low power consumption mode even while a screen saver function is actuated. A display apparatus used in such a notebook type personal computer is arranged by a display screen for displaying thereon image data sent from a main apparatus; memory means for storing thereinto screen protecting image data; and display control means for displaying the screen protecting image data stored in the memory means on the display screen under such a condition that the main apparatus is not actually operated for a predetermined time period.

21 Claims, 6 Drawing Sheets

| SYSTEM MODE | CPU | GRAPHICS CONTROLLER | SCREEN DISPLAY | |
|---|---|---|---|---|
| NORMAL | NORMAL | NORMAL | on | PRIOR ART |
| SCREEN SAVER | NORMAL | NORMAL | on | PRIOR ART |
| SUSPEND | SUSPEND | SUSPEND | off | PRIOR ART |
| NORMAL | NORMAL | NORMAL | on | PRESENT INVENTION |
| SCREEN SAVER | SUSPEND | SUSPEND | on | PRESENT INVENTION |
| SUSPEND | SUSPEND | SUSPEND | off | PRESENT INVENTION |

DISPLAY APPARATUS INCLUDING SCREEN SAVER FUNCTION

BACKGROUND OF THE INVENTION

1. Field of the Invention

The present invention generally relates to a display apparatus for displaying characters and figures (hereinafter referred to as "image") in a computer system. More specifically, the present invention is directed to a display apparatus equipped with a screen saver function in the computer system.

2. Description of the Prior Art

Figure 6:
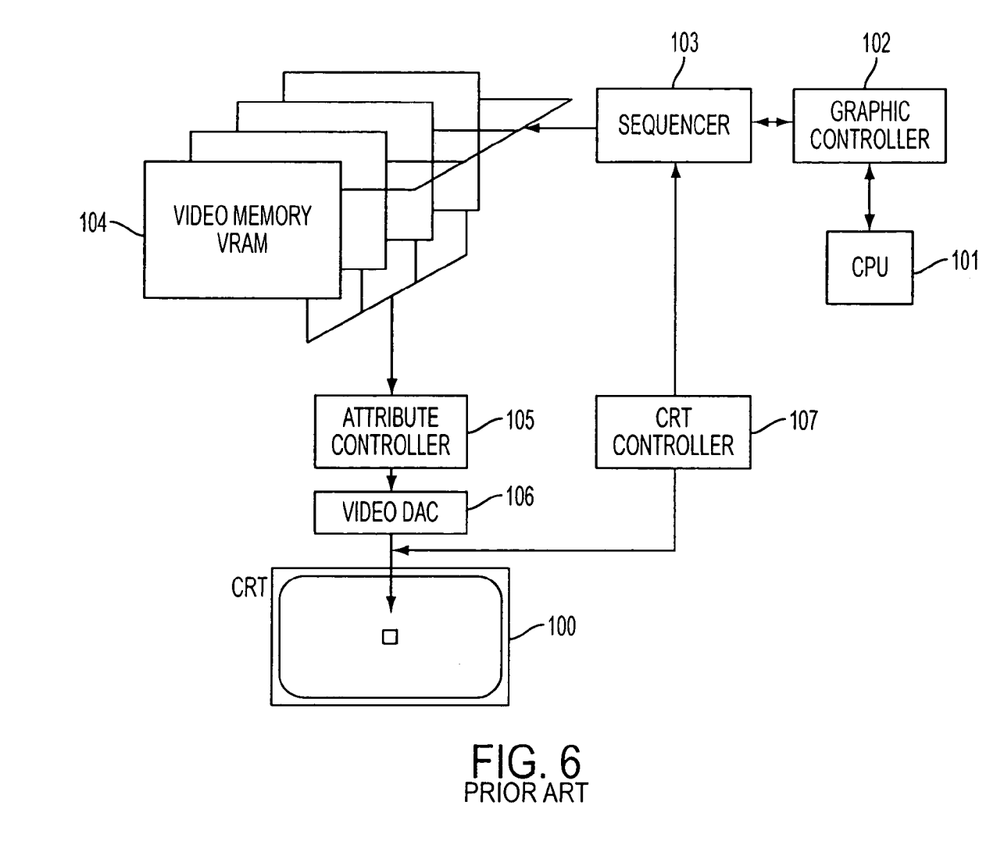
FIG. 6 (PRIOR ART) is a schematic block diagram for showing the conventional image display process operation.

FIG. 6 (PRIOR ART) (schematically represents a display system employed in a so-called "DOS/V" type personal computer system. This display system displays character data (text data), and image data (graphic data). It should be noted in this specification that a term "image" apparently contains images, figures, characters, graphics and the like. For example, image data may correspond to character data itself.

In this drawing, reference numeral 100 indicates a CRT display apparatus. This CRT display apparatus 100 is connected to a computer main frame, and may display thereon the text data and the graphic data. In this computer main frame, there are provided a central processing unit (CPU) 101, a graphic controller 102, a video sequencer 103, a video RAM (VRAM) 104, an attribute controller 105, a video DAC 106, and a CRT controller 107.

The VRAM 104 is such a memory for temporarily storing data used to display dots on a display screen. Image data processed by the CPU 101 is temporarily stored into this VRAM 104. The VRAM 104 is so arranged that for instance, a plurality of video planes having capacities of 64 KB (kilobytes), or 128 KB are combined with each other.

The graphic controller 102 sequentially writes the image data processed by the CPU 101 into the VRAM 104 in accordance with the image sequence defined by the sequencer 103. Since all of the video planes of the VRAM 104 are rewritten by the image data within one time, this graphic controller 102 executes a logic calculation between the data supplied from the CPU 101 and the display screen, and thus can draw images at a high speed. In the text mode, the graphic controller 102 converts the data outputted from the VRAM 104 into parallel digital data, whereas in the graphic mode, the graphic controller 102 converts the data derived from the VRAM 104 into serial digital data, and then outputs either the parallel or the serial digital data to the video DAC 106.

The attribute controller 105 contains a palette register used to produce a 6-bit color code from 4-bit display data outputted from the VRAM 104 and to output this 6-bit color code.

The video DAC 106 converts the image data (digital data) supplied via the attribute controller 105 into an analog signal to be displayed on the display 100.

The CRT controller 107 generates a vertical scanning signal and a horizontal scanning signal used in the display 100, and further generates a read address used to read the image data from the VRAM 104. Then, in accordance with the image display sequence defined by the sequencer 103, the image data outputted from the VRAM 104 is displayed on the display 100 under control of the CRT controller 107.

The foregoing description is made of a basic arrangement VGA (Video Graphics Array) used to display a screen image. Now, a sequential operation of displaying a Japanese language on such a DOS/V type personal computer will be described as a concrete example. In this case, text data is displayed on the CRT display 100.

First, when this DOS/V type personal computer is initiated, a predetermined storage area is secured in an extended memory, and a Japanese character font is stored into this extended memory area.

On the other hand, a virtual VRAM (namely, virtual text VRAM) area is secured in a conventionary memory. This conventionary memory implies the most major memory area having the capacity of 640 KB within the main memory device. When a Japanese character is entered from a keyboard, a code of this inputted character is written into this virtual VRAM.

Subsequently, a Japanese character font corresponding to the character code written into this virtual VRAM is received, and then the received Japanese character font is written into the graphic VRAM (namely, above-described video memory) to be represented on the display 100.

Such a font representation is carried out by a wordprocessor operated, or accessed on this DOS/V type personal computer. There are many possibilities that the personal computer is not actually operated for a predetermined time period, because a computer operator takes a rest while this operator forms a document, or this computer operator interrupts this document forming work, so that entries of the Japanese characters are stopped.

In such a case, if the same content of the display screen is continuously represented for a long time duration, then a so-called "image sticking" phenomenon may occur. To avoid this difficulty, a so-termed "screen saver" program has been developed. In accordance with this screen saver program, when a computer is not actually operated for a predetermined time period, screen protecting image data is slightly moved on a display screen.

However, since even such a screen saver program constitutes a portion of a computer program, this screen saver program is loaded on a main memory of a central processing unit (CPU) employed in a computer. Then, this screen saver program is executed by this CPU, and thus, the screen protecting image data is displayed on a display unit under control of a graphic controller and a CRT controller.

As a result, even when the conventional computer is not actually operated by operators, the central processing unit and the respective controllers must be actually operated, so that the electric power is continuously consumed.

This power consumption causes a very serious problem in a portable notebook type personal computer, namely a battery capacity thereof is limited.

On the other hand, a certain type of portable notebook personal computers is equipped with a low power consumption mode. In this low power consumption mode, a screen image representation is stopped when this type of personal computer is not actually operated within a preselected time duration.

In this stopping condition of the screen display, the above-explained "image sticking" phenomenon may be avoided even when a such a screen saver program is not introduced. However, since the screen display is stopped, no operator can confirm as to whether or not the notebook type personal computer itself is operated under initiation condition, resulting in inconvenient operation.

SUMMARY OF THE INVENTION

The present invention has been made to solve the above-explained problem and therefore, has an object to provide a display apparatus equipped with such a function operable as a "screen saver" without giving any adverse influences to operation modes of an information processing apparatus itself.

To solve the above-explained problem, a display apparatus, according to an aspect of the present invention, is featured by comprising: a display screen for displaying thereon image data sent from a main apparatus; memory means for storing thereinto screen protecting image data; and display control means for displaying the screen protecting image data stored in the memory means on the display screen under such a condition that the main apparatus is not actually operated for a predetermined time period.

It should be understood that the above-described main apparatus implies such a computer main frame equipped with a central processing unit (CPU), and a graphic controller. A major feature of the present invention is such that a display control means for initiating a "screen saver" program is separately employed with the computer main frame.

As the above-explained screen protecting image data, any sorts of data displayable on the screen may be used, for instance, character data, still image data, and moving picture image data. To secure such a merit that the storage capacity of the memory means can be minimized, either the character data or the still image data is preferably employed. In general, such screen protecting image data is displayed by executing a so-called "screen saver" program. This screen saver program is initiated by such a condition that the main apparatus is not actually operated, or accessed for a predetermined time duration. Such a fact that the main apparatus is not actually operated may be judged by that no preselected computer input is made, or a predetermined access is not made to the display apparatus.

The display control means causes the screen protecting image data to be displayed on the display screen of the display apparatus. To avoid an "image sticking" phenomenon, or an "image persistence" phenomenon, when either the character data or the still image data is displayed, the display position of this screen protecting image data is varied in a time sequential manner.

It should be noted that as the above-described display screen, a flat panel display constructed of a liquid crystal display, or a plasma display is preferably used.

In this case, the above-described memory means is a data rewritable memory into which the screen protecting data can be rewritten from the main apparatus side. In other words, arbitrary image data can be selected as the screen protecting image data.

Also, a main apparatus control means is preferably provided with the display control means provided on the side of the display apparatus. Under such a condition that the main apparatus is not actually operated, or accessed for a preselected time duration, this main apparatus control means transmits a control signal to the main apparatus side. While such a control signal is transmitted, the main control apparatus receives this control signal and can change the normal power consumption mode into the low power consumption mode. Thus, even when the main apparatus is operated in the low power consumption mode, such a condition that the screen saver is initiated can be maintained.

In the case that the present invention is grasped based upon an overall system of a computer, the present inventive display apparatus can be grasped as the following systems:

That is, an information processing system, according to another aspect of the present invention, is featured by comprising: a main apparatus for processing image data; and a display apparatus for displaying the image data sent from the main apparatus on a display screen; wherein:

the main apparatus includes an image data storage means for storing image data to be displayed; and a main display control means for causing the image data stored in the image data storage means to be displayed on the display screen; and the display apparatus includes a memory means for storing thereinto screen protecting image data; and a sub-display control means for causing the screen protecting image data stored in the memory means to be displayed on the display screen under such a condition that the main apparatus is not actually operated for a predetermined time period.

In this case, preferably, the main apparatus is further comprised of an operation mode control means for changing a normal power consumption mode of the main apparatus into a low power consumption mode. Also, the display apparatus further includes a main apparatus control means for transmitting a control signal to the main apparatus under such a condition that the main apparatus is not actually operated for the predetermined time period. Then, upon receipt of the control signal transmitted from the main apparatus control means, the operation mode control means changes the normal power consumption mode of the main apparatus into the low power consumption mode.

In addition, a display control apparatus having the function according to the present invention may be interposed between a computer main frame and a display apparatus.

As this display control apparatus, the below-mentioned display control apparatus may be accomplished.

That is, a display control apparatus, according to a further aspect of the present invention, is featured by comprising: memory means for storing thereinto screen protecting data; and display control means for causing the screen protecting image data stored in the memory means to be displayed on a display screen of the display apparatus under such a condition that a main apparatus is not actually operated for a predetermined time period; whereby:

when no access is made from the main apparatus to the display apparatus for the predetermined time period, an image produced from screen protecting image data is displayed on the display screen of the display apparatus.

In this case, the above-described memory means is a data rewritable memory into which the screen protecting data can be rewritten from the main apparatus.

Also, a main apparatus control means is preferably provided with the display control means provided on the side of the display apparatus. Under such a condition that the main apparatus is not actually operated, or accessed for a preselected time duration, this main apparatus control means transmits a control signal to the main apparatus side. While such a control signal is transmitted, the main control apparatus receives this control signal and can change the normal power consumption mode into the low power consumption mode.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described in detail.

Figure 1:
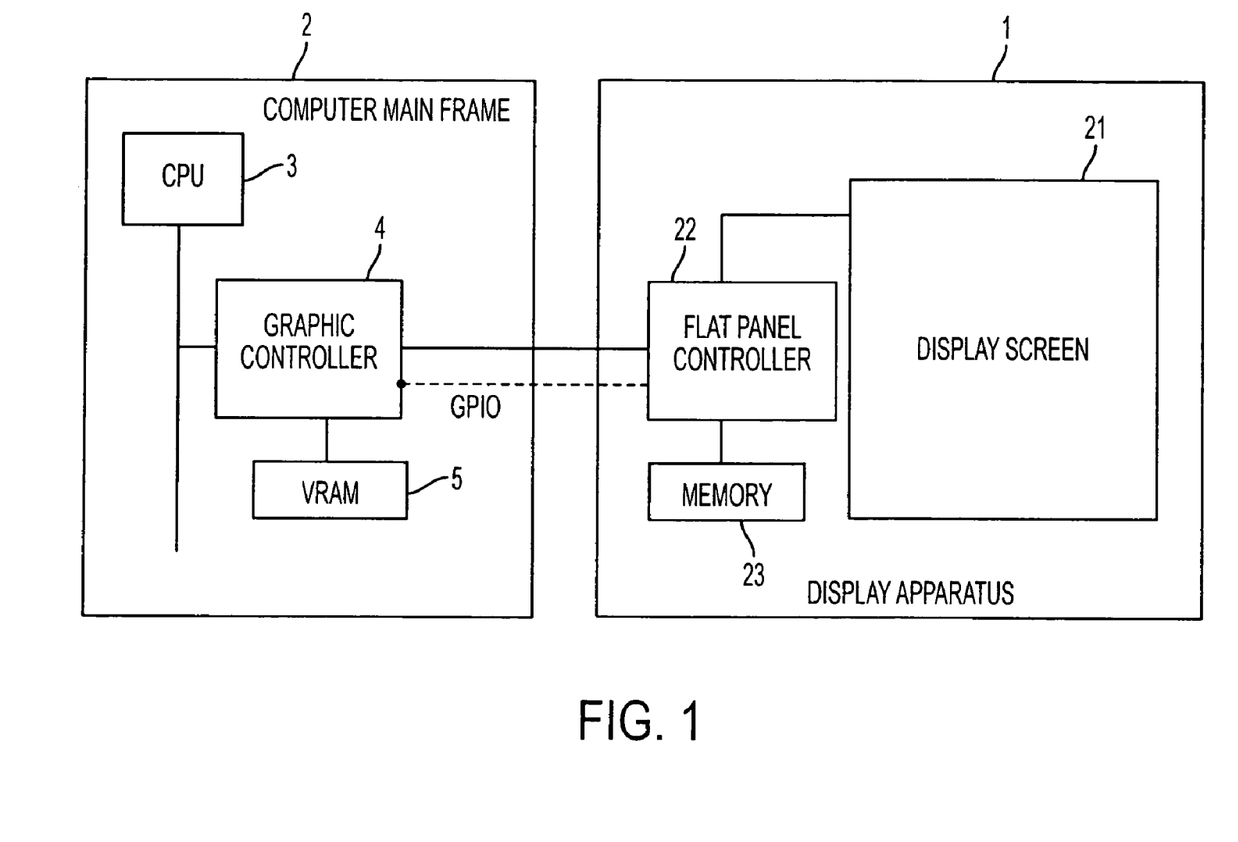
FIG. 1 is a schematic block diagram for showing a display apparatus of a notebook type personal computer, according to an embodiment of the present invention.
Figure 2:
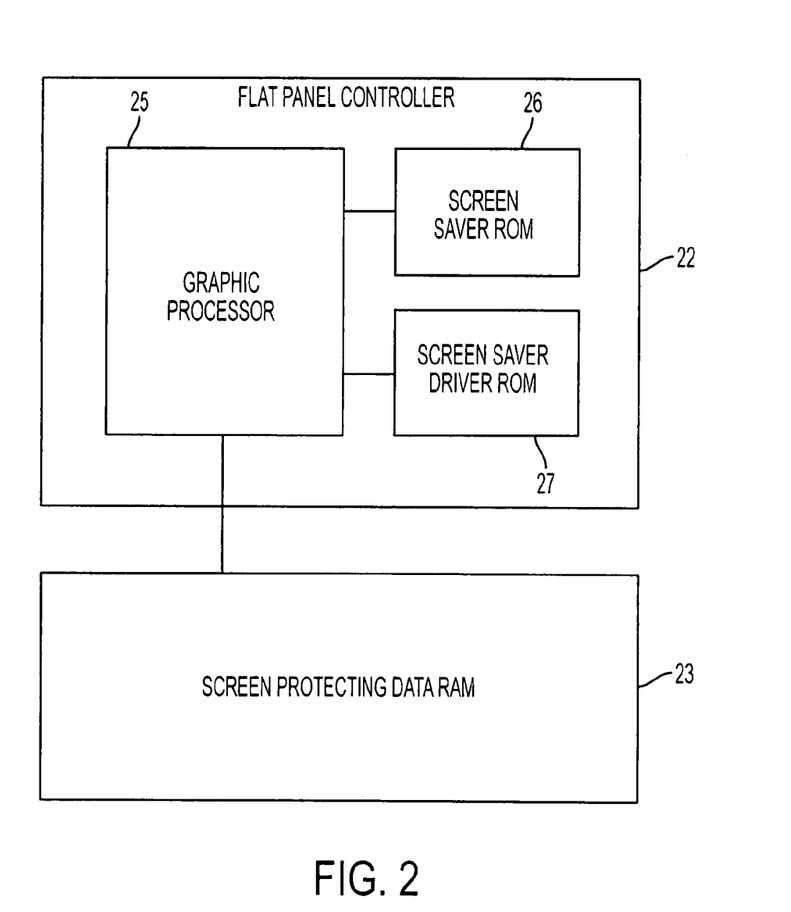
FIG. 2 is a schematic block diagram for representing a display control apparatus of the display apparatus shown in FIG. 1.

FIG. 1 and FIG. 2 are schematic block diagrams for representing an arrangement of a display apparatus according to an embodiment of the present invention.

In FIG. 1, reference numeral 1 denotes a display apparatus of a so-called "notebook type personal computer." This display apparatus 1 is connected to a computer main frame 2.

The computer main frame 2 contains a central processing unit (CPU) 3, a graphic controller 4 which constitutes a main display control means, and a VRAM (video RAM) 5 for storing image (video) data processed in the central processing unit 3. The above-explained arrangement of this computer main frame 2 is similar to that of the conventional computer main frame. As a result, although not shown in the drawing, input/output devices such as a keyboard, a mouse, a CD-ROM drive, and a floppy disk drive; a main memory; and an extended memory and the like are provided as standard devices, or optional devices. It should be noted in this specification that a term "image" apparently contains images, figures, characters, graphics and the like. For example, image data may correspond to character data itself.

In the computer main frame 2, a normal power consumption mode and a low power consumption mode can be selectively set as a power consumption function. In the normal power consumption mode, a commercial power source is used to drive this computer main frame 2. In the low power consumption mode, a battery built in this notebook type personal computer is used to drive this computer. When this low power consumption mode is selected, when the personal computer is not actually operated for a preselected time period, a supply of electric power to at least one of the central processing unit 3 and the graphic controller 4 is stopped, or interrupted so as to save the actual power consumption in this personal computer.

On the other hand, a liquid crystal flat display screen 21, a flat panel controller 22, and a RAM (memory means) 23 for storing screen protecting data are provided in the display apparatus. The flat panel controller 22 functioning as a sub-display control means sequentially supplies the image data which are sent from the above-described graphic controller 4 functioning as a main display control means to the liquid crystal display screen 21 for display controls. The screen protecting data RAM 23 is connected to the flat panel controller 22, and stores thereinto the screen protecting data.

As indicated in FIG. 2, a graphic processor 25 is employed in the display control means (flat panel controller) 22, and a "screen saver" (program) is functionally realized on this graphic processor 25. It should be noted that this screen saver is a computer program previously stored in a ROM (read-only memory) 26. Also, a screen saver driver 27 is functionally realized in the form of a computer program in this display control means (flat panel controller) 22. When no input is entered into the computer main frame 2 for a predetermined time duration, this screen saver driver 27 executes initiation/stop controls of the screen saver, and furthermore transmits a control signal to the computer main frame 2. On the other hand, the screen saver driver 27 may constitute a portion of the display control means, and also a main apparatus control means. This display control means causes the screen protecting image data stored in the memory means to be represented on the display screen under such a condition that the main apparatus is not actually operated for a preselected time period. Also, this screen saver driver 27 transmits the control signal to the main apparatus under such a condition that the main apparatus is not actually operated for a preselected time duration. This screen saver driver 27 is previously stored in the above-described ROM 27 in the form of the computer program, and is initiated to become activated on the graphic processor 25 at the same time when the power source of the display apparatus is turned ON.

The screen saver is such a computer program used to read the characters and the image data stored in the screen protecting data RAM (memory means) 23, and to change the display positions of these characters and image data on the display screen in a time sequential manner. Since the data saved in this screen protecting data RAM (memory means) 23 can be rewritten, these saved data may be rewritten by the data entered from the input device provided on the computer main frame 2.

It should be understood that a GPIO (General-Purpose Input/Output) terminal is provided with the above-described graphic controller 4, and this GPIO terminal is connected to an I/O terminal of the flat panel controller.

A description will now be made of operations of this display apparatus according to the present invention.

Normal Screen Display Operation

The image data processed in the central processing unit 3 is once stored in the VRAM 5 under control of the graphic controller 4 of the computer main frame 2. Thereafter, the image data sequentially outputted from the VRAM 5 are displayed on the display screen 21 under control of the flat panel controller 22 in response to the control signal supplied from the graphic controller 4. As to this operation, the basic operation of the display apparatus according to this embodiment is similar to that of the conventional display apparatus, although the flat panel controller 22 is newly employed.

Figure 3:
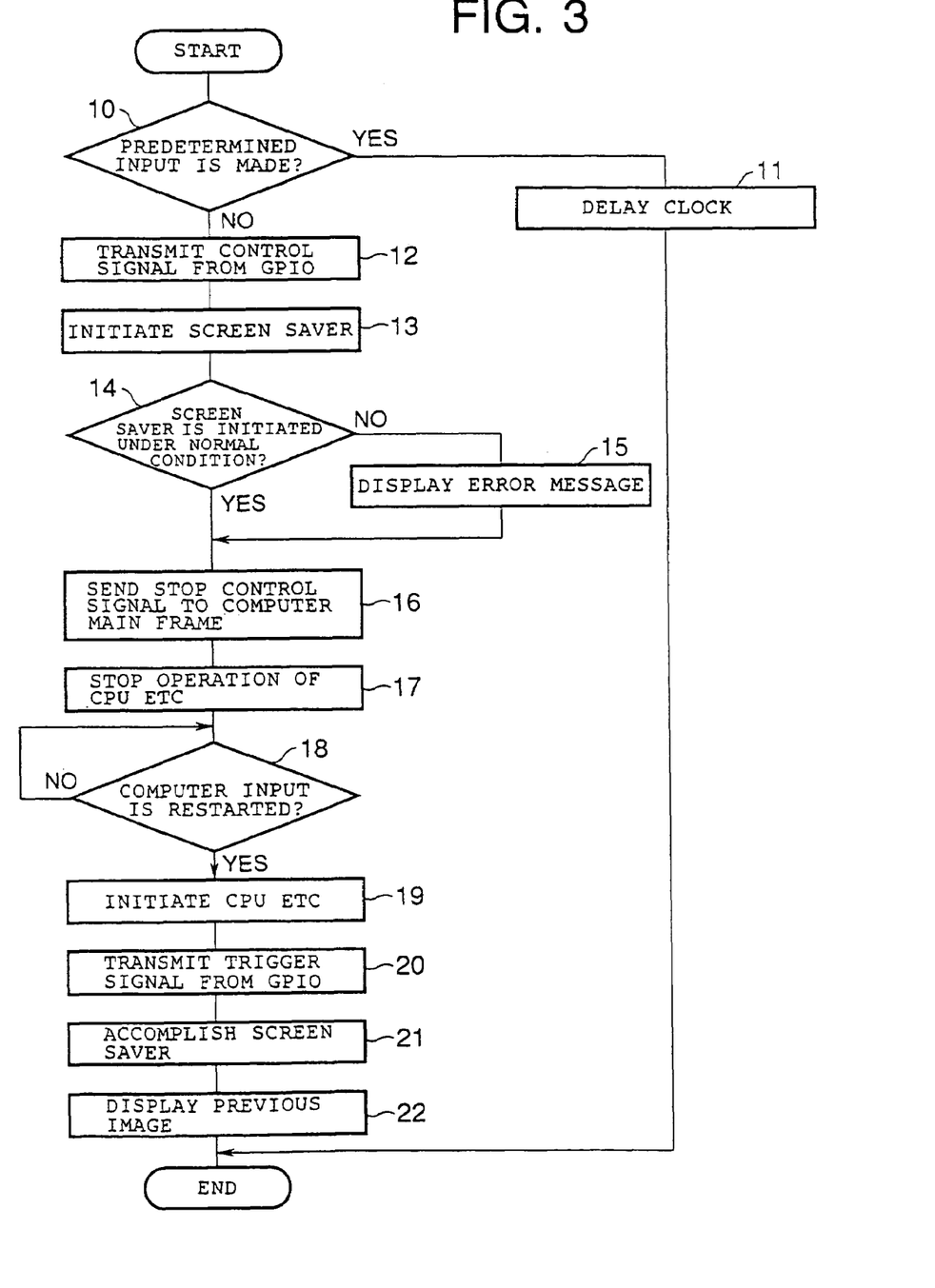
FIG. 3 is a flow chart for describing a process flow operation of the display apparatus shown in FIG. 1.

Operation of Display Apparatus when Computer Operation is Interrupted for Predetermined Time Referring now to a flow chart shown in FIG. 3, a description will be made of operation of the display apparatus when the computer operation is stopped during a predetermined time period.

A program indicated in this flow chart is a routine executed every time a clock has passed for a predetermined time period.

First, when the clock for determining the execution time of the routine is counted during a preselected time period, a judgment is made at step 10 as to whether or not a predetermined input is entered to the computer until the clock is counted for a predetermined time period. In other words, the operation judging means of the computer may be realized. When the input is entered into the computer, the clock is delayed (step 11). That is to say, this routine shown in FIG. 3 is not executed during this delayed time.

Conversely, when a predetermined input is not entered into the computer at step 10, a control signal is transferred via the GPIO of the graphic controller 4 (step 12).

Upon receipt of this control signal, the screen saver driver 27 continuously activated the graphic processor 25 of the flat panel controller 22 initiates the screen saver (step 13).

Next, a check is made as to whether or not the screen saver is initiated under normal condition (step 14). In such a case that this screen saver is not initiated under normal condition, an error message is displayed by the flat panel controller (step 15). Thereafter, this process operation is advanced to the next step 16.

Conversely, when the screen saver is initiated under normal condition, this process operation is directly advanced to step 16. At this step 16, the screen saver driver 27 sends a stop control signal to the computer main frame 2.

Upon receipt of the stop control signal, the operation mode of the computer main frame 2 is changed into the low power consumption mode (namely, suspend mode), and therefore, at least one of the graphic controller 4 and the central processing unit 3 is stopped (step 17). As a consequence, while the screen saver is displayed on the display screen on the side of the display apparatus, namely the screen saver initiation condition, both the central processing unit 3 and the graphic controller 4 are stopped on the side of the computer main frame, namely the suspend condition. This control operation according to the embodiment of the present invention could not be realized in the prior art display apparatus.

Figure 4:
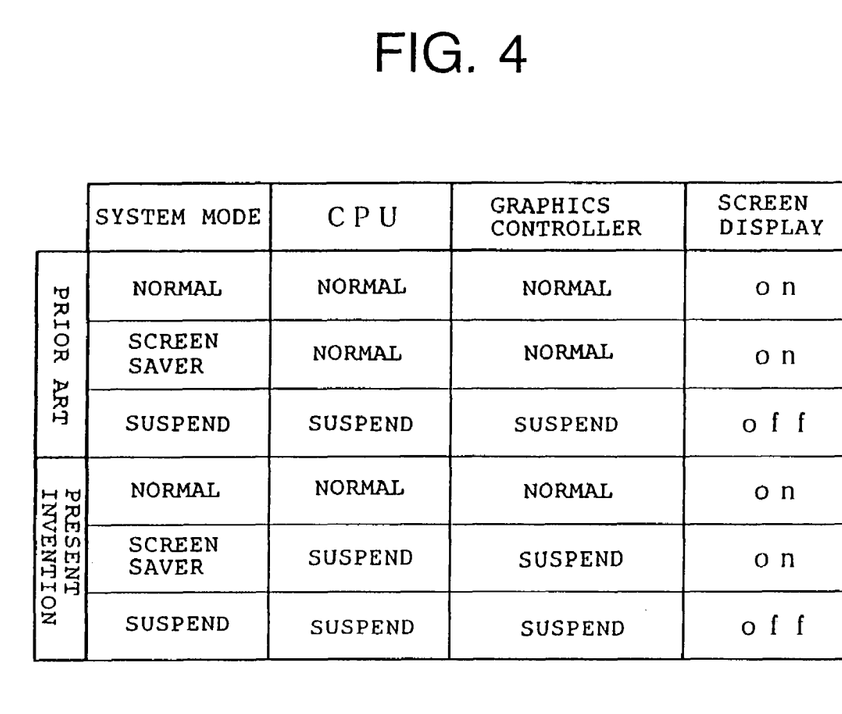
FIG. 4 represents an operation condition table in comparison with the prior art.

Alternatively, it is possible to set such an operation mode that no screen saver is continuously initiated. In this case, the process operations defined at steps 13, 14 and 15 are not executed, but the screen saver driver 27 simply transmits the stop control signal to the computer main frame 2 in step 16. As a result, when the process operation defined at the subsequent step 17 is carried out, both the central processing unit 3 and the graphic controller 4 are brought into the suspend condition, and at the same time, the screen display is brought into the OFF state. The above-described operation results are indicated in a table of FIG. 4.

Thereafter, when an input is again entered to the computer (step 18), both the central processing unit 3 and the graphic controller 4 are initiated by receiving this input as a trigger signal (step 19). At the same time, another trigger signal (control signal) issued from the GPIO of the graphic controller 4 is sent to the flat panel controller (step 20).

Upon receipt of this trigger signal, the screen saver driver accomplishes the screen saver (step 21).

On the other hand, since the central processing unit 3 is again initiated at step 19, the processed image data which has been produced before the computer input operation is interrupted is supplied from the VRAM 5 via the flat panel controller 22 to the display screen 21 under control of the graphic controller 4. As a result, the original (previously produced) image is displayed on the display screen 21 (step 22), so that the subsequent computer process operation may be restarted.

OTHER EMBODIMENTS

Figure 5:
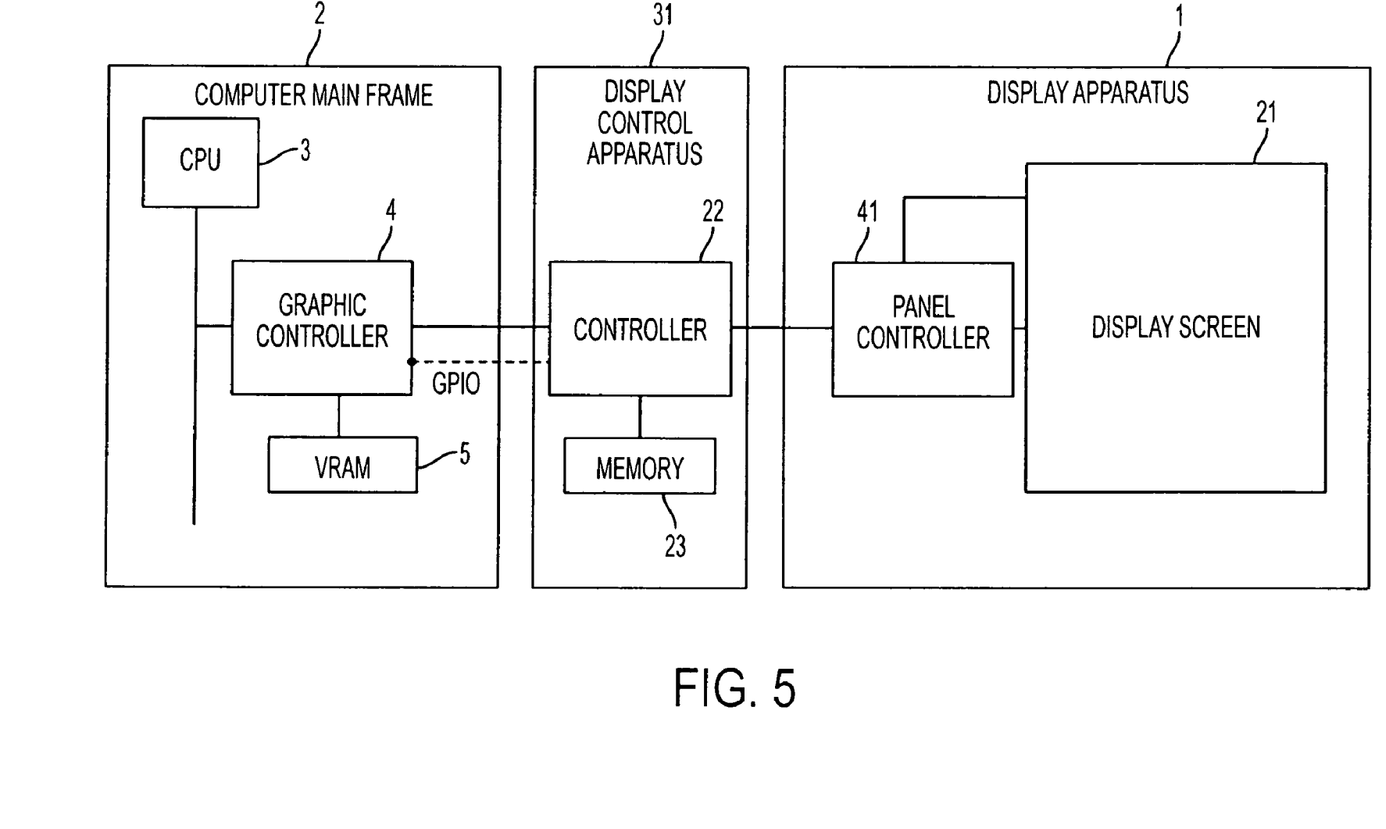
FIG. 5 is a schematic block diagram for indicating an arrangement of a display apparatus according to another embodiment of the present invention.

In the foregoing description, the overall computer system equipped with the display apparatus according to the present invention has been described. Alternatively, another computer system may be arranged as indicated in FIG. 5. That is, both the display control means (controller) 22 containing the microcomputer, the screen-saver-built-in type ROM, and the screen-saver-driver-built-in type ROM, and further the screen protecting data RAM (memory means) 23 may be formed as a display control apparatus 31. This display control apparatus 31 is physically separated from the display apparatus 1. Then, this separately provided display control apparatus 31 is added to the display apparatus 1 equipped with the display screen 21 and the panel controller 41 having no screen saver function.

Also, in each of the above-described embodiments, when the memory means 23 for storing the screen protecting data is realized as a detachable type memory with respect to the display apparatus, the screen protecting data may be simply replaced. In particular, when a plurality of cartridge type ROMs capable of storing thereinto different sorts of screen protecting data are preferably employed, the screen protecting data may be more simply replaced.

It should be understood that although this embodiment is basically applicable to a CRT display apparatus in view of the theoretical aspect, but this embodiment may be suitably applied to such a liquid crystal type display device equipped with a flat panel controller functioning as a dedicated graphic controller in view of the realistic aspect. This dedicated graphic controller is separately provided with a graphic controller employed in a computer main frame.

As previously described in detail, according to the present invention, the screen saver function which can be separately initiated irrespective of the operations of the main unit of the information processing apparatus, can be realized on the side of the display apparatus.

As a result, in the case that the low power consumption function is provided in the information processing apparatus, while the screen saver can be initiated on the display screen, the main unit of the information processing apparatus is brought into the low power consumption condition.

What is claimed is:

1. A display apparatus, comprising:
a display screen displaying thereon image data sent from a main apparatus;
a memory unit storing thereinto screen protecting image data; and
a display control unit operable to control the screen protecting image data stored in said memory unit to be displayed on said display screen irrespective of an operation mode of the main apparatus, said display control unit transmitting a control signal for changing the operation mode of the main apparatus into a low power consumption mode under a predetermined condition.

2. The display apparatus of claim 1, wherein:
said memory unit is a data rewritable memory, and the image protecting data is written into said memory unit from the main apparatus.

3. The display apparatus of claim 1, wherein:
said display control unit provided on the side of said display apparatus comprises a main apparatus control unit transmitting a control signal, to control the operation mode of the main apparatus, to the main apparatus under such a condition that the main apparatus is not actually operated for a predetermined time period.

4. The display apparatus of claim 1, wherein the a display control unit is operable to control the screen protecting image data to be displayed on said display screen based on the operation mode of the main apparatus.

5. An information processing system, comprising:
a main apparatus processing image data; and
a display apparatus displaying the image data sent from said main apparatus on a display screen; wherein:
said main apparatus includes:
an image data storage unit storing image data to be displayed; and a main display control unit causing the image data stored in the image data storage unit to be displayed on the display screen; and said display apparatus includes:

a memory unit storing thereinto screen protecting image data; and a sub-display control unit operable to control the screen protecting image data stored in said memory unit to be displayed on the display screen irrespective of an operation mode of the main apparatus, said sub-display control unit transmitting a control signal for changing the operation mode of the main apparatus into a low power consumption mode under a predetermined condition.

6. The image processing apparatus of claim 5, wherein:

said main apparatus further comprises an operation mode control unit changing a normal power consumption mode of said main apparatus into a low power consumption mode;

said display apparatus further comprises a main apparatus control unit transmitting a control signal, to control the operating mode of the main apparatus, to said main apparatus under such a condition that said main apparatus is not actually operated for a predetermined time period; and upon receipt of the control signal transmitted from said main apparatus control unit, the operation mode control unit changes the normal power consumption mode into the low power consumption mode.

7. The image processing apparatus of claim 5, wherein the sub-display control unit is operable to control the screen protecting image data to be displayed on the display screen based on the operation mode of a main apparatus.

8. A display apparatus, comprising:

a memory unit storing thereinto screen protecting data; and a display control unit operable to control the screen protecting image data stored in said memory unit to be displayed on a display screen of the display apparatus irrespective of an operation mode of a main apparatus, said display control unit transmitting a control signal for changing the operation mode of the main apparatus into a low power consumption mode under a predetermined condition.

whereby when no access is made from the main apparatus to the display apparatus for a predetermined time period, an image produced from screen protecting image data is displayed on the display screen of the display apparatus.

9. The display control apparatus of claim 8, wherein:

said memory unit is a data rewritable memory, and the image protecting data is written into the memory unit from the main apparatus.

10. The display control apparatus of claim 8, further comprising:

a main apparatus control unit transmitting a control signal, to control the operation mode of the main apparatus, to the main apparafus under such a condition that the main apparatus is not actually operated for the predetermined time period.

11. A display apparatus, comprising:

a display screen displaying thereon image data sent from a computer main frame, the computer main frame including a central processing unit, random access memory, a graphic controller and video random access memory;

a rewritable memory unit, separate from the random access memory and separate from the video random access memory, storing thereinto screen protecting image data; and a display control unit, separate from the graphic controller, operable to control the screen protecting image data stored in said rewritable memory unit to be displayed on the display screen irrespective of an operation mode of the computer main frame, said display control unit transmitting a control signal, to control the operation mode of the computer main frame, to the computer main frame to instruct the computer main frame to not operate for a predetermined time period, and said display control unit transmitting a control signal for changing the operation mode of the computer main frame into a low power consumption mode under a predetermined condition.

12. The display apparatus of claim 11, wherein the display control unit is operable to control the screen protecting image data to be displayed on the display screen based on the operation mode of the computer main frame.

13. A display system for a portable computer, comprising:

a computer main frame including a central processing unit, a graphic controller, random access memory, and video random access memory; and a display apparatus including:

a display screen displaying thereon image data sent from said computer main frame, a screen protecting data random access memory, independent from the random access memory and the video random access memory of said computer main frame, storing screen protecting image data, and a display control unit, independent from the central processing unit of said computer main frame, operable to control the screen protecting image data stored in the screen protecting data random access memory to be displayed on the display screen irrespective of an operation mode of the computer main frame; and said display control unit transmitting a control signal for changing the operation mode of said computer main frame into a low power consumption mode under a predetermined condition.

14. The display system of claim 13, wherein the display control unit changes from a normal power consumption mode into a low power consumption mode then provides a signal, to control an operation mode of the computer main frame, to the computer main frame instructing the computer main frame to enter a low power consumption mode.

15. The display system of claim 14, wherein the screen protecting image data is a screen saving program.

16. The display system of claim 13, wherein the screen protecting image data is a screen saving program.

17. The display system of claim 13, wherein the display control unit is operable to control the screen protecting image data to be displayed on the display screen based on the operation mode of the computer main frame.

18. A method of controlling a display apparatus, comprising:

displaying image data on a display screen sent from a computer main frame, storing screen protecting image data in a screen protecting data random access memory, independent from a random access memory and a video random access memory in said computer main frame, displaying the screen protecting image data stored in the screen protecting data random access memory on the display screen irrespective of an operation mode of the computer main frame, and operation mode of the computer main frame into a low power consumption mode under a predetermined condition.

19. The method of claim 18, further comprising:

displaying the screen protecting image data on the display screen based on the operation mode of the computer main frame.

20. A display apparatus for a data processing device, comprising:

a display screen displaying image data;

a memory storing screen protecting image data; and a display controller causing the screen protecting image data stored in said memory unit to be displayed on said display screen, and transmitting a control signal to the data processing device to place the data processing device in an energy saver mode under a predetermined condition.

21. The display apparatus of claim 20, wherein the predetermined condition is that the data processing device is not activated by a user for a predetermined period of time.

* * * * *

UNITED STATES PATENT AND TRADEMARK OFFICE
CERTIFICATE OF CORRECTION

PATENT NO.         : 7,239,310 B2
APPLICATION NO.    : 09/124231
DATED              : July 3, 2007
INVENTOR(S)        : Nobuharu Iinuma It is certified that error appears in the above-identified patent and that said Letters Patent is hereby corrected as shown below:

Column 8, Line 57, after "wherein the" delete "a".

Column 9, Line 43, change "condition." to --condition,--.

Column 9, Line 57, change "apparafus" to --apparatus--.

Column 10, Line 38, change "frame;" to --frame,--.

Column 11, Line 1, after "and" insert --transmitting a control signal for changing the--.

Signed and Sealed this

Twentieth Day of November, 2007

JON W. DUDAS
*Director of the United States Patent and Trademark Office*